US005173867A

United States Patent [19]

Johnston et al.

[11] Patent Number: 5,173,867

[45] Date of Patent: Dec. 22, 1992

[54] MULTIPLE RAPPER CONTROL FOR ELECTROSTATIC PRECIPITATOR

[75] Inventors: David F. Johnston, Tabb; Michael M. Mahler, Hayes, both of Va.; Verne J. Pickren, Amelia Island, Fla.

[73] Assignee: BHA Group, Inc., Kansas City, Mo.

[21] Appl. No.: 558,819

[22] Filed: Jul. 27, 1990

[51] Int. Cl.[5] .......................... B03C 3/76; G06F 15/46

[52] U.S. Cl. ...................................... 364/550; 55/105; 55/112; 364/505; 364/480

[58] Field of Search .......................... 55/105, 112, 139; 323/241, 246, 903; 361/154, 160, 166, 168.1, 191; 364/480, 481, 483, 505, 506, 500, 502, 550

[56] References Cited

U.S. PATENT DOCUMENTS

| | | | |
|---|---|---|---|
| 4,008,057 | 2/1977 | Gelfand et al. | 55/105 |
| 4,035,165 | 7/1977 | Archer | 55/112 X |
| 4,086,646 | 4/1978 | Lanese | 55/112 X |
| 4,111,669 | 9/1978 | League | 55/112 |
| 4,255,775 | 3/1981 | Andrews | 55/112 X |
| 4,290,003 | 9/1981 | Lanese | 55/105 X |
| 4,624,685 | 11/1986 | Lueckenotie et al. | 364/500 X |
| 4,928,456 | 5/1990 | Del Gatto et al. | 364/502 X |
| 5,015,267 | 5/1991 | Del Gatto et al. | 55/112 X |

*Primary Examiner*—Kevin J. Teska

*Attorney, Agent, or Firm*—Kokjer, Kircher, Bowman & Johnson

[57] ABSTRACT

A multiple rapper control (10) for an electrostatic precipitator for monitoring and individually controlling each of a plurality of rappers based on computer (12) stored rapper characteristics including the voltage type, the voltage level, the pre-set electrical input current, the minimum increment between energization cycles, and the maximum duration of energization. Each rapper is connected to a TRIAC switch device (20) linked to a computer (14) and a power control means (16) to vary the input power to each rapper supplied from a power source (18). Current detecting means (22) is bi-directionally connected to the computer (14) and is connected to the power control means (16) to sense and measure the peak electrical input current to each rapper. A preselected logic sequence stored in the computer (12) controls power to each rapper. Optional polarity reversal means (37) eliminate undesirable magnetization of rapper components.

41 Claims, 6 Drawing Sheets

MULTIPLE RAPPER CONTROL FOR ELECTROSTATIC PRECIPITATOR

BACKGROUND AND SUMMARY OF THE INVENTION

This invention relates generally to electrostatic precipitators for air pollution control and, more specifically, concerns the control of the rapping process used to clean the internal collection plates and discharge electrodes of electrostatic precipitators.

Continuous emphasis on environmental quality has resulted in increasingly strenuous regulatory controls on industrial emissions. One technique which has proven highly effective in controlling air pollution has been the removal of undesirable particulate matter from a gas stream by electrostatic precipitation. An electrostatic precipitator is an air pollution control device designed to electrically charge and collect particulates generated from industrial processes such as those occurring in cement plants, pulp and paper mills and utilities. Particulate laden gas flows through the precipitator where the particulate is negatively charged. These negatively charged particles are attracted to, and collected by, positively charged metal plates. The cleaned process gas may then be further processed or safely discharged to the atmosphere.

During continuous operation of an electrostatic precipitator, the collector plates, electrodes and other precipitator internal components must be periodically cleaned to remove the dust build-up which accumulates on these surfaces. The cleaning mechanism typically consists of a mechanical rapper. An electronic rapper controller determines the sequence, intensity, and duration of rapping. Once the particulate is dislodged from the plates, it falls into collection hoppers at the bottom of the precipitator.

Rappers are electromechanical devices that are used to mechanically dislodge collected particulate/materials within an electrostatic precipitator, electronic filter or dust collector (hereafter referred to as ESP) by applying direct current (DC) energization to the rapper. In general, a rapper consists of a hammer that mechanically strikes an anvil. The anvil is mechanically connected to the internal components of the ESP, such as the discharge electrodes, collecting plates, gas distribution devices or any other component cleaned by the rapper. Striking the rapper shaft or anvil with the hammer transmits mechanical forces to these components to dislodge collected materials. Several rapper variations exist which may be employed in the cleaning process.

One rapper variation consists of a cylindrical hammer or plunger and solenoid coil. The hammer rests on the rapper shaft or anvil. When the solenoid coil is energized with a DC voltage the resulting electromagnetic force overcomes the force of gravity and lifts the hammer vertically to a height that is determined by the amplitude and length of time of the energization. When said energization is terminated, the electromagnetic field is removed and the hammer drops due to gravitational forces and strikes the anvil. The hammer then rests on the anvil until the next energization.

Another rapper variation places a spring behind the cylindrical hammer. When the solenoid coil is energized with a DC voltage the resulting electromagnetic force will overcome the force of gravity and lift the hammer vertically compressing the spring against the rapper assembly. The height and spring compression are determined by the amplitude and length of time of the energization. When the energization is terminated the hammer strikes the anvil with a force that is comprised of gravitational force plus the spring expansion.

Another rapper variation places a spring behind the cylindrical hammer. This spring is connected to the hammer and holds it above the anvil. When the solenoid coil is energized with a DC voltage the resulting electromagnetic force will overcome the force of the spring and accelerate the hammer downward to strike the anvil. When the energization is terminated, the hammer is returned to position by the spring.

The energization of the rapper solenoid coil induces a flow of electromagnetic flux around this coil and which also flows through the cylindrical hammer and other rapper components. In addition, there are stray undesirable flows of electromagnetic flux some of which pass through the anvil assembly. The amount of undesirable electromagnetic interaction with the anvil and other components is dependent upon the type and construction of the rapper.

Since the energization is DC, and therefore unipolar (i.e., one direction), the components are exposed to repeated electromagnetic energization with the same orientation of North and South poles. To illustrate, the electromagnetic flux flow radiates from the coil in the same direction every time it is energized. The flow direction moves outward from the coil and around to the bottom of the anvil through the anvil's top, then upward through the bottom of the hammer and out through its top. Because the hammer and anvil are separated, each will have a North and South pole. As this unipolar energization is repeated, the North and South poles of both the hammer and anvil become stronger until they retain their magnetic orientation. As stated by Lenz's Law, this induced magnetic effect is proportional to the amount of energy used to create it and will, therefore, oppose it with like force. On successive energizations, therefore, this residual magnetization will oppose lifting the hammer to its desired level. This is particularly true when the hammer rests on the anvil.

The result of this residual magnetization is that the anvil and hammer are of different poles and are therefore attracted to each other and may not lift at all when the energization is at a low level. The length of time and amplitude of the energization are varied to adjust the intensity of the rapper.

In practice, numerous operational problems associated with the cleaning process may be experienced. Excessive rapping results in the particulate billowing from the plate into the gas stream where it is re-entrained in gas flow and must be recaptured. Otherwise, the re-entrained dust will be discharged from the exhaust stack, resulting in unacceptable emissions into the atmosphere. Insufficient rapping prevents the particulate from falling from the surfaces to be cleaned. In either case, collection efficiency of the precipitator is reduced which reduces the gas volumes that can be treated by the precipitator. In most industrial applications there is a direct correlation between precipitator capacity and production capacity. Therefore, there are significant monetary benefits to be derived from maximizing rapper efficiency. Also, grossly inefficient precipitators which allow an excessive amount of particulate emissions into the atmosphere can prompt the Environmental Protection Agency to shut a particular process down indefinitely.

In the prior art, rapper control has been limited to manually controlling and adjusting the current level to an entire group of rappers, rather than individual rapper control. However, rappers in different locations within the group may operate more efficiently with different current levels. Since the number of rapper groups, as well as the number of rappers within each group, may vary and prior art rapper control only allows for intensity adjustment of an entire group, a compromise in control standards therefore prevails. The result is often rapper inefficiencies that reduce precipitator and production capacity as well as increase emission levels.

Similarly, open and short trip values must be set for the rappers as a unit. Since rappers at different locations may have different current protection requirements, the prior art represents yet another compromise. To protect the rappers as a unit the least sensitive rapper must de-energize when a circuit condition occurs that is threatening to the most sensitive rapper. This is inefficient since some rappers will at time be de-energized unnecessarily even though their particular operating parameters are not exceeded.

With respect to circuit protection, the prior art uses fuse or relay technology to detect and isolate fault conditions. This technology is slow in that the devices require up to several full cycles before electrical protection can be assured. Within several full cycles of a fault condition significant damage can occur to rapper circuitry. Some commercial rapper control systems purport to incorporate solid state fault detection, but the trip level is set high because all rappers are required to have the same trip level. The trip level cannot be individually adjusted to a specific single rapper within these systems and a compromise in control standards results.

Another drawback of the prior art is that rapper control technology is an open looped system. The current level is set at a particular point in time, considering the present rapper conditions in the electrostatic precipitator. But, rapper conditions are not static. Numerous things can change rapping conditions which often affect current flow to the rappers. For instance, the precipitator may operate at elevated temperatures which change the ambient temperature of the rapper. Rapper slugs as they energize travel through a sleeve which often gets dirty and sticky. Numerous influences change the rappers characteristics but the prior art requires control just as if the conditions are constant. This again results in inefficiencies.

The prior art does not provide an easy or economical way to check the present operating conditions of rappers in large precipitators. Presently, technicians must personally walk near each precipitator while watching and listening to determine whether a specific rapper is operating. To determine the present current flow to a rapper, or to determine what current a particular style of rapper draws, a technician must personally measure each rapper input with a meter. In large precipitators (for instance, 250 rappers or more) it becomes cost prohibitive to personally check the efficiency of each rapper.

Similarly, the prior art is unable to provide trending information for specific rappers, which can be very important in troubleshooting, calculating overall operating efficiencies, as well as calculating the useful life expectancies of specific rappers.

In addition, the prior art does not provide a means by which the undesirable, residual magnetism created within rapper components can be eliminated.

A long felt need in the air pollution control industry remains for improvements in rapper control for electrostatic precipitators to alleviate the many operational and maintenance difficulties which have been encountered in the past. The primary goal of this invention is to fulfill this need.

The present invention provides an improved way to control power to a rapper within an electrostatic precipitator.

Since manually adjusting current to rappers as a unit is inherently inefficient, an important object of this invention is to provide a means for individually pre-setting electrical operating conditions for each rapper within a multiple rapper precipitator.

Another object of this invention is to provide a means for individually setting short and open trip conditions for each rapper within a multiple rapper precipitator. This will eliminate the compromise required in the prior art and increase rapper efficiency.

Still another object of this invention is to provide fault protection which assures detecting and isolating a fault condition within ½ cycle from the moment a fault occurs. Reducing fault trip response times from several full cycles to ½ cycle will greatly increase circuit protection and increase the useful life expectancy of the rappers and precipitator as a whole.

Another object of this invention is to provide a closed-loop control means for a rapper. Enabling the rapper current control to sense, measure and adjust the input current in the event the actual current is not substantially similar to the pre-set electrical input current will greatly aid rapper efficiency.

Yet another important object of this invention is to provide a source of rapper energization that will reverse polarity every time an individual rapper is energized. Further, the polarity of energization will be remembered so that it can be reversed on the occurrence of each energization.

It is also an object of this invention to de-magnetize those rappers that have become magnetized with prior art controls.

Also, it is a further object of this invention to more accurately control rapper lift and thereby rapper intensity by eliminating the detrimental and inconsistent effects of residual magnetism on predicting consistent rapper lift.

Another important object of this invention is to provide present operating conditions for each rapper within a precipitator and to store the rapper operating conditions. This will provide an economical way to check the actual operating conditions of each rapper as well as provide information for troubleshooting and trending.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith, and in which like reference numerals are used to indicate like parts in the various views.

This invention specifically contemplates the control of a plurality of rappers for an electrostatic precipitator. This description uses two rappers for illustrative purposes and not as a limitation on the number of rappers to be used in practicing the invention.

Figure 1:
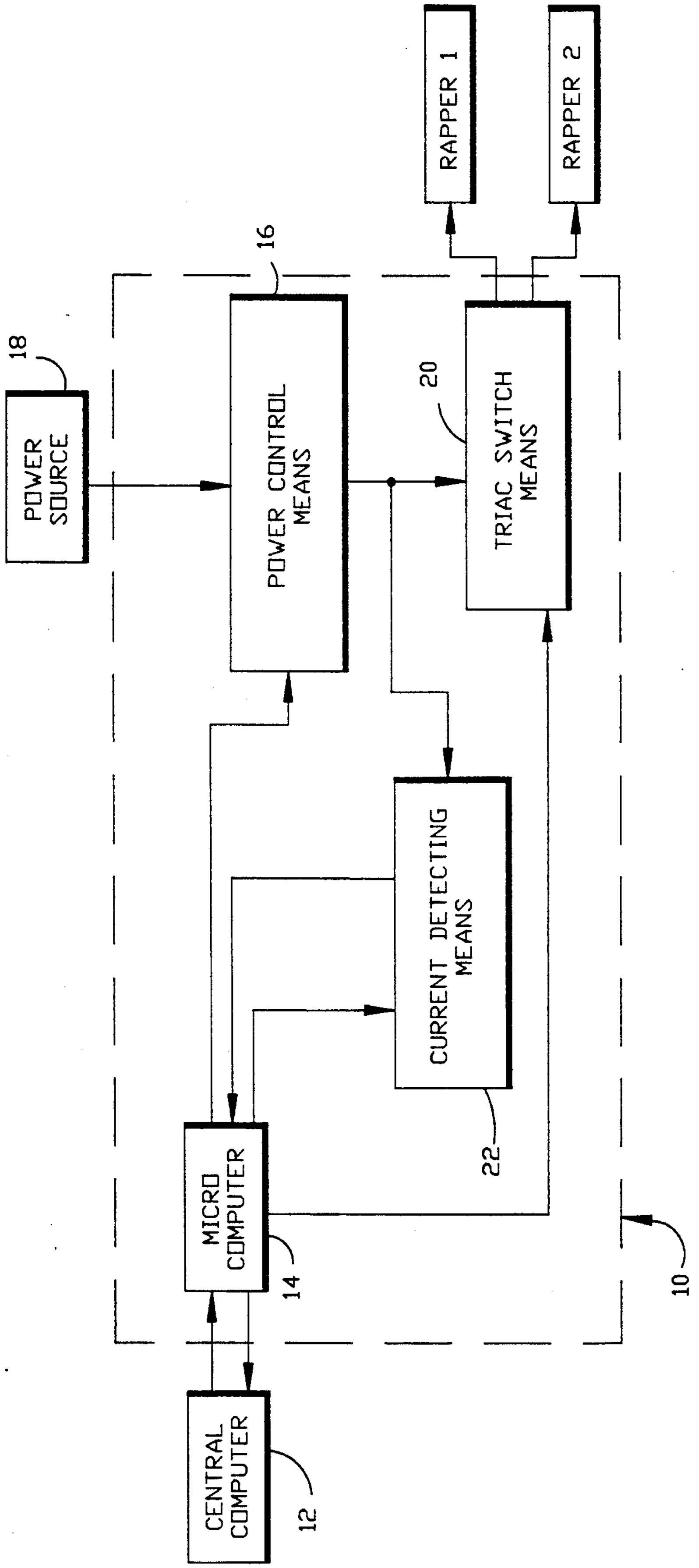
FIG. 1 is a block diagram illustrating a multiple rapper control constructed in accordance with a preferred embodiment of the invention.

A multiple rapper control embodying the principles of this invention is shown in FIG. 1 of the drawings with the control block designated generally by the reference numeral 10. Control block 10 is connected to a central computer 12, a power source 18 and a plurality of rappers as schematically indicated by Rapper 1 and Rapper 2 blocks. More specifically, central computer 12 is bi-directionally connected to a microcomputer 14 which in turn is connected to both a power control means 16 and a TRIAC switch device 20. Power control means 16 is connected between a power source 18 and TRIAC switch device 20. A current detecting means 22 senses and measures the current between power control means 16 and TRIAC switch device 20. Current detecting means 22 is connected to the output of power control means 16 and is bi-directionally connected to microcomputer 14. Rapper 1 and Rapper 2 are each individually connected to a TRIAC within the TRIAC switch device 20. In other words, each rapper is connected to only one TRIAC and, conversely, each TRIAC is connected to only one rapper. The TRIAC may be typically characterized as a silicon bi-directional triode thyristor, such as T6420M of Motorola designated for a 600 volt rating for 40 amps.

Figure 2:
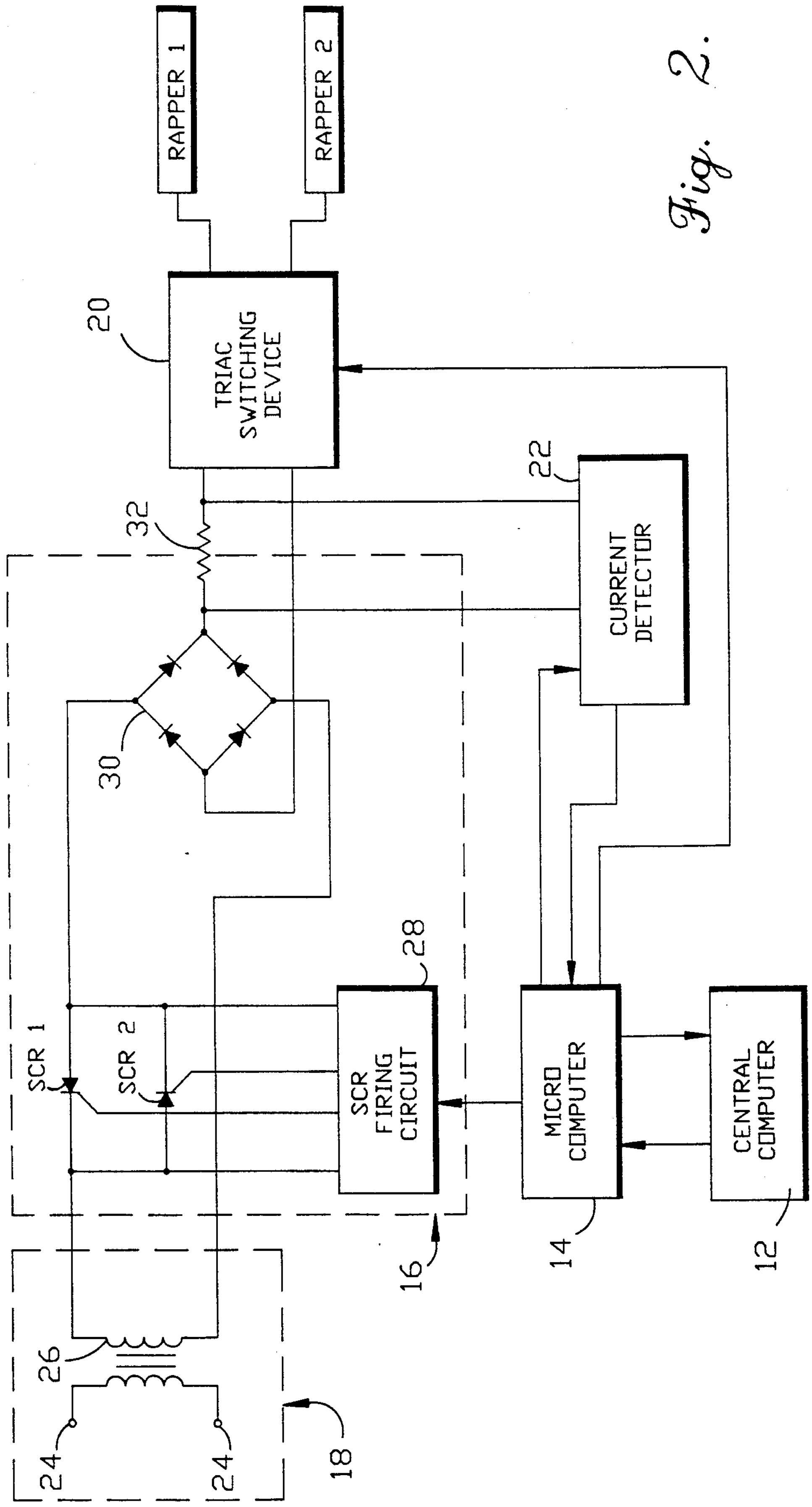
FIG. 2 is a block diagram showing the power source and power control means of the multiple rapper control in more detail.

The power control means 16 and power source 18 are illustrated in FIG. 2. Power control means 16 comprises an SCR firing circuit 28, a full-wave rectifier 30, an SCR 1 and an SCR 2. Power source 18 comprises a transformer 26 and two input terminals 24 to which power is applied. The input terminals 24 are connected to the primary of transformer 26. One side of the secondary of transformer 26 is connected to an inverse parallel SCR 1 and SCR 2 which connects, along with the other side of the secondary of transformer 26, to full-wave rectifier 30. SCR firing circuit 28 is connected serially between microcomputer 14 and the inverse parallel SCR 1 and SCR 2.

Figure 3:
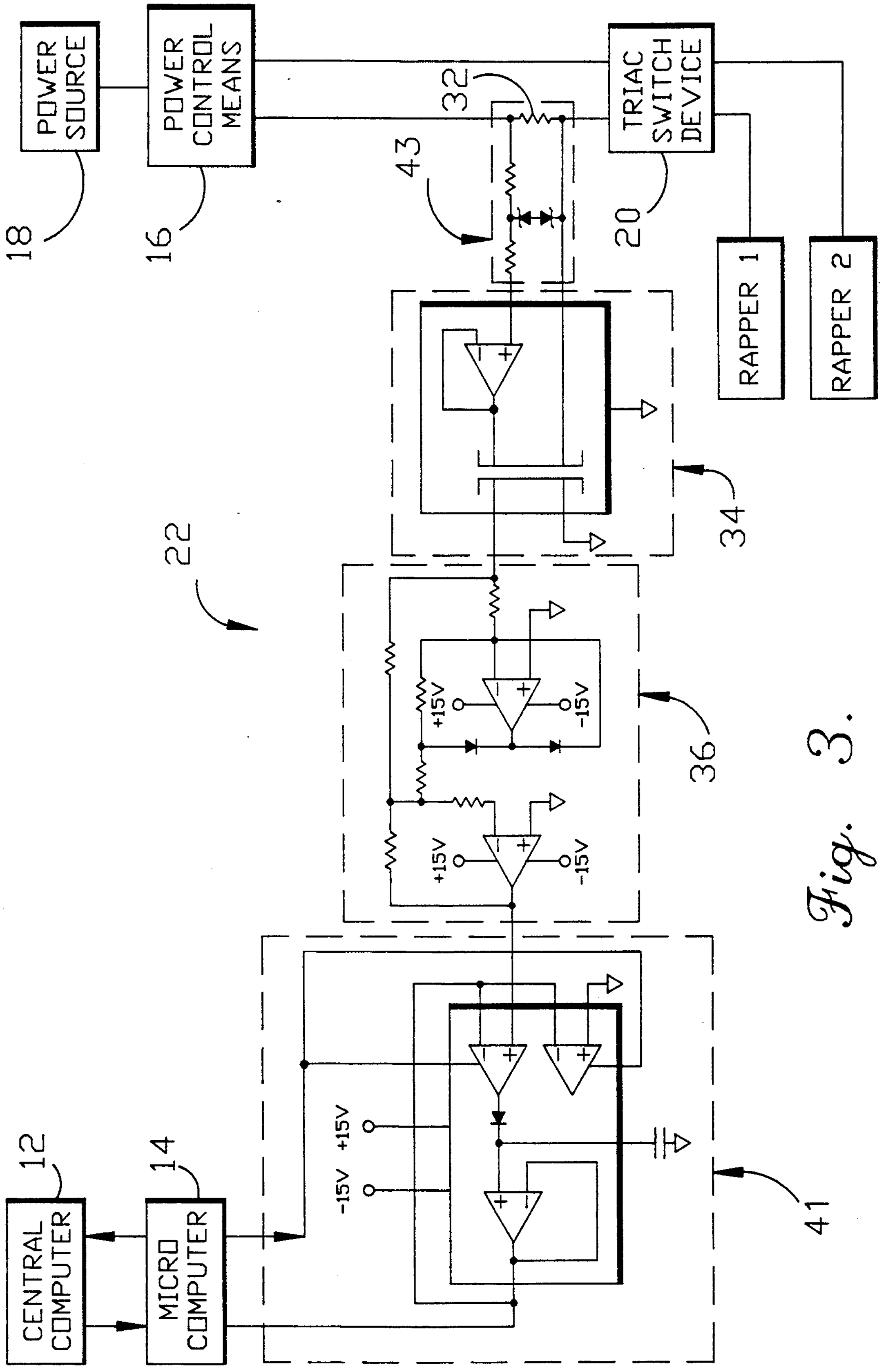
FIG. 3 is a block diagram showing the current detecting means of the multiple rapper control in greater detail.

The current detecting means 22 is best illustrated in FIG. 3. One sense resistor 32 is connected serially between power control means 16 and TRIAC switch device 20. The sense resistor 32 is also connected across a conventional input protection circuit 43 and then to an isolation amplifier 34 connected serially with a precision rectifier 36. Precision rectifier 36 is connected with a peak detector 41 which bi-directionally connects to microcomputer 14. Isolation amplifier 34 may typically comprise an AD202JN chip such as manufactured by Analog Devices of Norwood, Mass. Precision rectifier 36 comprises two operational amplifiers and two high speed switching diodes (such as 1N4148 diodes) appropriately biased to rectify the input characteristic to a DC level that is independent of the voltage drop across the diodes. The two operational amplifiers may comprise TL032CP operational amplifiers characterized as an enhanced JFET (junction field effect transistor), low power, low offset, analog operational amplifier such as manufactured by Texas Instruments of Dallas, Tex. The peak detector 41 may typically comprise a PKD01FP chip such as manufactured by Precision Monolithics Inc. of Santa Clara, Calif. and characterized as a monolithic peak detector with reset and hold mode.

Figure 4:
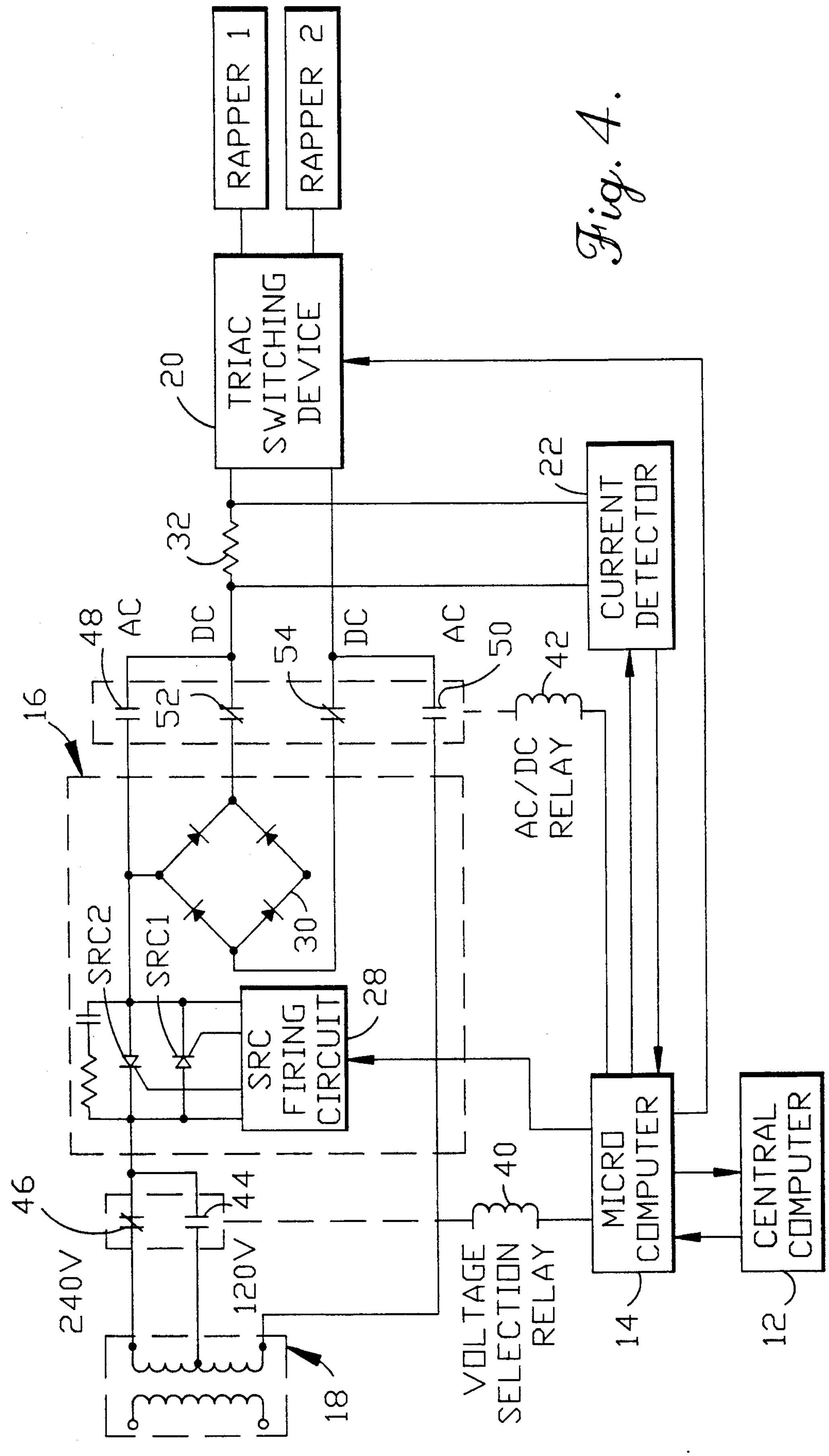
FIG. 4 is a block diagram showing the power source and power control means, along with an optional voltage selection relay and the AC/DC relay of the multiple rapper control.

The components which allow a rapper to receive either an AC or DC signal at 120 volts or 240 volts are best illustrated in FIG. 4. Microcomputer 14 is connected to both a voltage selection relay 40 and an AC/DC relay 42. Voltage selection relay 40 is connected to a normally open contact 44 and a normally closed contact 46. Normally closed contact 46 is connected to the 240 volt lead of power source 18, and normally open contact 44 is connected to the 120 volt lead of power source 18. Both contacts 44 and 46 connected to the inverse parallel SCR1 and SCR2. The AC/DC relay 42 is connected to two normally open contacts 48 and 50 and two normally closed contacts 52 and 54. Normally open contact 48 is connected to the inverse parallel SCR1 and SCR2 while normally open contact 50 is connected directly to the power source 18. Both normally open contacts 48 and 50 are connected to TRIAC switch device 20. Normally closed contacts 52 and 54 are connected to the positive and negative output of bridge rectifier 30, respectfully. Both normally closed contacts 52 and 54 connect with TRIAC switch device 20.

In operation, a look-up table including characteristics for each individual rapper is determined, entered and stored in central computer 12. The look-up table parameters comprise the location of each rapper, the rapper type (i.e., AC or DC voltage), the voltage level, the pre-set current characteristic of each rapper, open and short trip conditions for each rapper, the maximum duration of energization and the minimum time delay between energization cycles for each rapper. Microcomputer 14 is a slave to central computer 12 in that the microcomputer 14 waits for instruction from the central computer 12 before beginning operation. Upon receiving instruction from central computer 12 to energize Rapper 1, the microcomputer receives the location of Rapper 1, the voltage type and level of Rapper 1, the pre-set current characteristic for Rapper 1, the time duration of energization and the open and short trip conditions for Rapper 1. The pre-set current characteristic is stored in local memory at microcomputer 14 and then transmitted to power control means 16. The duration of energization is converted into a time equivalent number of frequency half cycles and fractional half cycles. This number of half cycles is transmitted to power control means 16. The open and short trip conditions are also stored in local memory at the microcomputer 14. The location of Rapper 1 is translated at microcomputer 14 into a specific TRIAC switch and information to energize the appropriate TRIAC is transmitted to TRIAC switch device 20.

SCR firing circuit 28 of the power control means 16 receives the pre-set Rapper 1 current characteristic, and duration of energization in terms of half cycles and fractional half cycles, from microcomputer 14. The SCR firing circuit 28 translates the pre-set current characteristic for Rapper 1 into a firing angle, Theta, which is sent to SCR 1 and SCR 2. Power is applied to the rapper in terms of SCR firing angle degrees. The sinusoidal electrical cycle contains 360 degrees, and consists of a positive half cycle and a negative half cycle with respect to polarity. Each SCR can be fired anywhere from 0 degrees to 180 degrees in the electrical cycle, 0 degrees being full power and 180 degrees being 0 power. When an SCR is fired at 45 degrees, for example, it will conduct from 45 degrees to 180 degrees. Therefore, a difference in firing angles can be represented as a distance along the abscissa of the sine wave. Due to polarity reversal, the SCR stops conducting when the current passing through the SCR falls below a specified holding current for the device.

The normal operating state of SCR 1 and SCR 2 is 180 degrees which allows 0 power from transformer 26 to pass through to the rappers. After SCR firing circuit 28 translates the pre-set current characteristic into the appropriate firing pulse, it fires SCR 1 and SCR 2 which begins allowing the appropriate current to pass through to full-wave rectifier 30. SCR firing circuit 28 also counts the number of half cycles and fractional half cycles that pass through the SCR combination. SCR 1 and SCR 2 remain energized until the number of half cycles counted equals the number of half cycles transmitted from microcomputer 14. At this point SCR firing circuit 28 sends SCR 1 and SCR 2 a firing angle of 180 degrees, in effect ceasing power flow.

Full-wave rectifier 30 converts the AC signal which passes through SCR 1 and SCR 2 into a pulsating DC signal. As the pulsating DC signal exits full-wave rectifier 30, it also exits power control means 16. From power control means 16 the pulsating DC signal enters TRIAC switch device 20. The TRIAC, a multi-layered solid-state device, acts as an AC switch. There is one TRIAC per rapper. When a rapper is energized, its associated TRIAC is energized. Microcomputer 14, having translated the location of Rapper 1 into Rapper 1's corresponding switch and transmitted this information to TRIAC switch device 20, the appropriate switch is energized to allow the DC pulsating signal to pass to Rapper 1.

TRIAC switch device 20 may consists of a number of circuit boards with up to 16 TRIACs per board. Microcomputer 14 can typically accommodate a total of 16 circuit boards with 16 TRIACs per board. Thus, one microcomputer could characteristically accommodate a total of 256 TRIACs and 256 rappers. For a precipitator with more than 256 rappers, another control block 10 (including a second microcomputer, current detecting means, power control means and TRIAC switch means) could be added as required to replicate the system illustrated in FIG. 1. The central computer 12 and power source 18 would be connected to any additional control block 10 added to the basic arrangement.

The pulsating DC signal exiting power control means 16 is sensed and measured by current detecting means 22. This actual rapper input current is sensed and converted to a voltage by external sense resistors 32. This voltage passes through isolation amplifier 34, the output of which is an AC voltage proportional to the current flowing to Rapper 1. The output of isolation amplifier 34 is routed to precision rectifier 36 which rectifies an analog input to a DC level that is proportional to the sensed rapper input current. The DC level is independent of the voltage drop across the diodes within precision rectifier 36.

The output of precision rectifier 36 is routed to a peak detector 41. The peak detector 41 upon a command from microcomputer 14 will detect the peak value of the wave form at its input. This is a sample and hold device which, on command, will store the peak value. Current detecting means 22 provides an electrically isolated rectified peak detection of the input current for selected Rapper 1.

While Rapper 1 is being energized, microcomputer 14 instructs peak detector 41 to detect peak current. The microcomputer 14 takes the output of peak detector 41 and converts it to a digital word. This digital word is then compared by microcomputer 14 to previously stored short and open trip conditions and the pre-set input current characteristics for Rapper 1. At this point the speed of computations is very important. Once SCR 1 and SCR 2 of power control means 16 are energized, they cannot be turned off until the current passing through them falls below a specified holding current for the device. The current through these SCRs drops below the specified holding current approximately every 8.33 milliseconds. During that 8.33 millisecond time period current detecting means 22 must sense and measure the actual peak current entering Rapper 1; microcomputer 14 must take that information, convert it to a digital word, compare it to the stored short and open trip conditions, determine that a trip condition is met, and transmit information to SCR firing circuit 28 to designate a firing angle of 180 degrees before the SCRs are fired a second time. Preventing the SCRs from firing a second time in the event of a short or open condition is a significant improvement over the prior art and can be best accomplished by utilizing the speed inherent in microcomputers.

In the event a trip condition is not present, the same digital word is compared within microcomputer 14 to the previously stored pre-set input current characteristic for Rapper 1. Based on that comparison, information is transmitted to power control means 16 to perform any adjustments required to have the actual current entering Rapper 1 be substantially similar to the stored input current characteristic for Rapper 1.

Each time microcomputer 14 converts the output of peak detector 41 into a digital word, this same information is transmitted to central computer 12 and stored. This information is stored according to its corresponding rapper and is available for present operating conditions and trending purposes.

At the end of the rapping cycle, if there are no short or open conditions, all TRIACs are shut off and the microcomputer 14 waits for the next instruction. Central computer 12 at this time determines when the next rapper should be energized. When that time is reached the above process is repeated for the appropriate rapper. If a short or open condition does occur, the fault condition is sent to the central computer and that rapper's energization cycle is passed over in the future.

The embodiment of FIG. 4 is used to allow the rappers within a precipitator to operate at different voltage levels and with different signal types (AC or DC). When central computer 12 downloads the operating characteristics for a rapper to microcomputer 14, the rapper type (AC or DC) and voltage level is included. Microcomputer 14 transmits to voltage selection relay 40 the required voltage level. If 240 volts is needed, the normally closed contact 46 remains closed, and normally open contact 44 remains open, allowing all 240 volts available from power source 18 to pass. If 120 volts is needed, voltage selection relay 40 causes normally closed contact 46 to open and normally open contact 44 to close, which allows only 120 volts to pass from power source 18. Further, microcomputer 14 transmits to AC/DC relay 42 which voltage type the energized rapper requires. If DC voltage is needed, normally closed contacts 52 and 54 remain closed and normally open contacts 48 and 50 remain open. This connects TRIAC switch device 20 to the output of full wave bridge rectifier 30, which will in effect supply a DC signal to the rapper. If AC voltage is required, AC/DC relay 42 causes normally open contacts 48 and 50 to close and normally closed contacts 52 and 54 to open. This allows the AC signal leaving the inverse parallel SCR1 and SCR2 to bypass bridge rectifier 30, which in effect supplies the rapper with an AC signal. It should be noted that the relay contacts in FIG. 4 were illustrative as one embodiment and that solid state devices or comparable variations are understood to be included within this disclosure.

Figure 5:
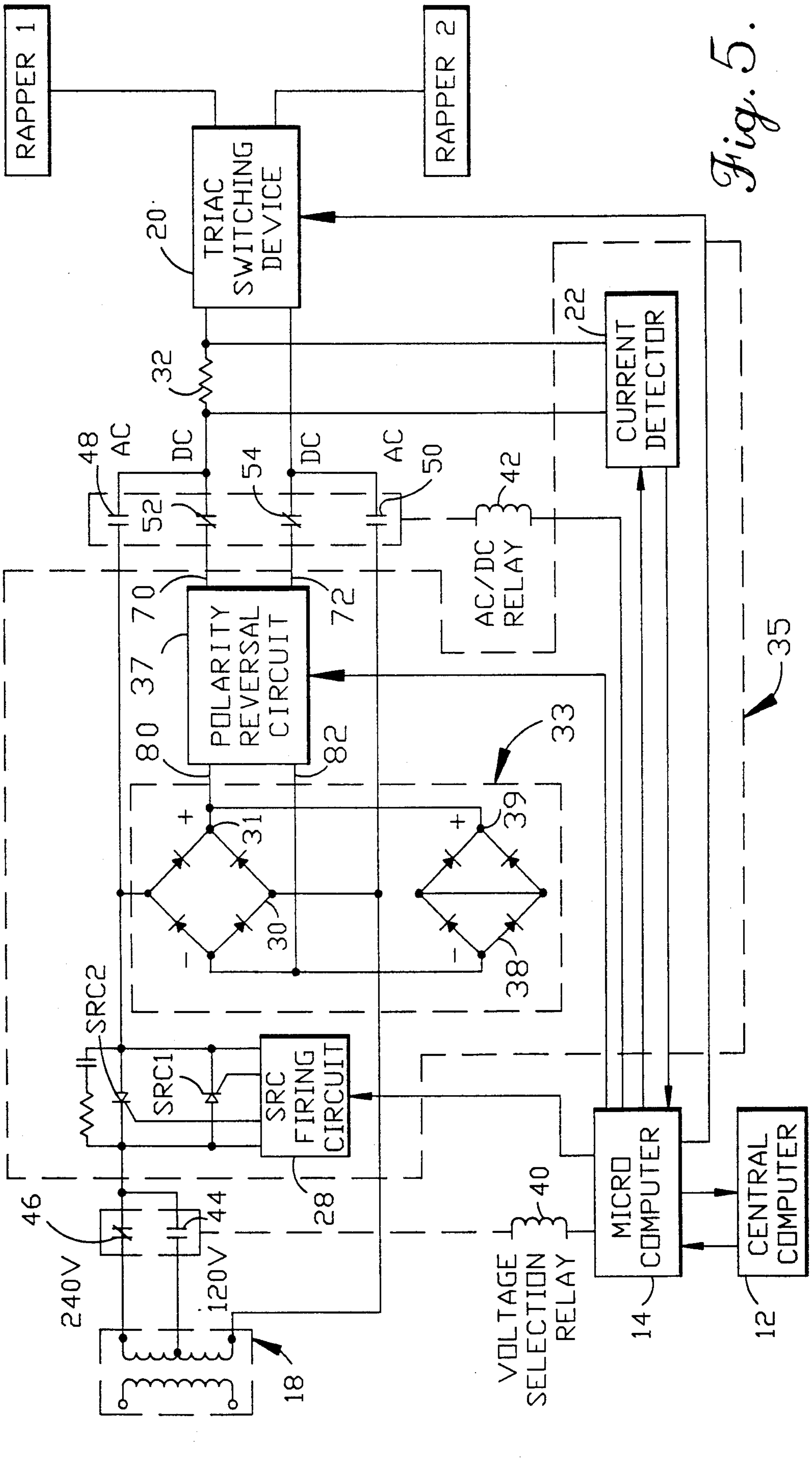
FIG. 5 is the block diagram of FIG. 4 including an additional and optional polarity reversal means.

Turning to FIG. 5, an alternative embodiment of the present invention is shown. Operation of this circuit is the same as described with reference to the original embodiment of the present invention with the addition of the polarity reversal of the supply to rapper 1 and 2 to prevent unwanted magnetic orientation of the rapper components. Preferably, SCR firing circuit 28, SCR 1 and SCR 2, bridge rectifier 30, damper diode bridge 38, current detector 22 and polarity reversal circuit 37 are placed on one circuit board and comprise power module 35.

Normally closed contacts 52 and 54 are connected to output terminals 70 and 72, respectively, of polarity reversal circuit 37. In general, circuit 37 reverses the polarity of the supply to rapper 1 and rapper 2 each time they are energized. This prevents an undesirable magnetic orientation at the rappers. Input terminal 80 of polarity reversal circuit 37 is connected to positive output 31 of bridge rectifier 30 and a positive output 39 of damper diode bridge 38. Bridge rectifier 30 and damper diode bridge 38 may be referred to as bridge combination 33 and serves as an input supply means for circuit 37. To assure proper polarity reversal at output terminals 70 and 72 of circuit 37, the signal to input terminal 80 must remain positive and the signal to input terminal 82 must remain negative. This is called the input integrity of circuit 37 and remains constant due to the selected arrangement of the bridge combination 33.

A rapper in operation causes transient electrical characteristics to flow back into the control circuitry. This wash-back may damage circuit components and decrease system operating efficiency. Damper diode bridge 38 protects the circuit components by absorbing and dissipating any transient electrical characteristics that have washed back from the rapper.

Figure 6:
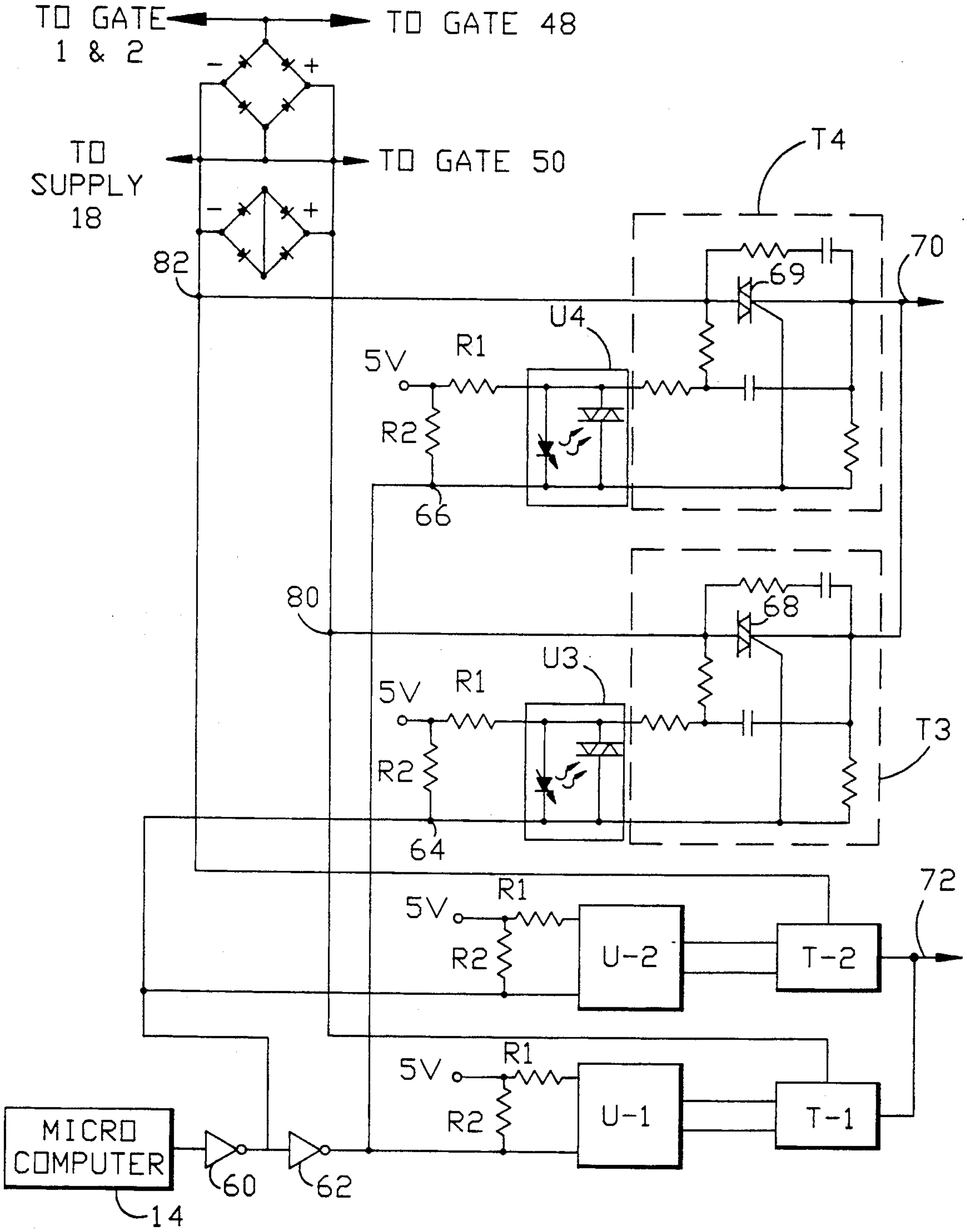
FIG. 6 is a block diagram showing the polarity reversal means of FIG. 5 in greater detail.

FIG. 6 illustrates the polarity reversal circuit 37. Circuit 37 is comprised of four identical TRIAC circuits $T_1$ through $T_4$ which are connected as a double pole, double throw switch. Since each TRIAC circuit is identical, only circuits $T_3$ and $T_4$ show the preferred configuration while circuits $T_1$ and $T_2$ are shown in block form for simplicity. A TRIAC, often called a bilateral thyristor can be switched to a conducting state when properly triggered.

Each TRIAC circuit is interfaced with microcomputer 14 through an accompanying optolectronic coupling device (optocoupler) $U_1$ through $U_4$ such as the MOC 3021 as made by Motorola Corporation, Phoenix, Ariz. Each optocoupler $U_1$ through $U_4$ has a five volt DC power supply and an input resistor configuration comprised of resistors $R_1$ and $R_2$.

Leads from positive input terminal 80 connect to TRIAC circuits $T_1$ and $T_3$. Leads from negative input terminal 82 connect to TRIAC circuits $T_2$ and $T_4$. The outputs from circuits $T_3$ and $T_4$ are connected to output terminal 70. Outputs from circuits $T_1$ and $T_2$ are connected to output terminal 72. Output terminals 70 and 72 act as supply means for providing polarity reversal to the rappers.

In operation, every time microcomputer 14 is instructed to energize a rapper, the rapper location and the polarity used is stored in memory of microcomputer 14. When the next energization occurs, the last polarity is obtained from memory and complimented to provide polarity reversal. The memory is then updated with this new value. This provides for polarity reversal each time the rapper is energized.

When polarity circuit 37 is energized, only two of the four TRIACs $T_1$ through $T_4$ will conduct, and the remaining two will not conduct, or will be off. When circuit $T_1$ and $T_4$ are conducting, the output polarity is negative. In this state, $T_2$ and $T_3$ are off, or not conducting. When $T_2$ and $T_3$ are conducting the output polarity is positive and $T_1$ and $T_4$ are off, or not conducting. As a result, each time a rapper is energized, it will have the opposite polarity that it had on the immediately proceeding energization. This polarity reversal prevents undesirable magnetization of the rapper components as a result of continuous uni-directional flow of electromagnetic flux.

The foregoing discussion describes the operation, results, and advantages of the polarity reversal circuit in accordance with the present invention. The following example is presented to clarify the preferred configuration of polarity reversal circuit 37 as described herein. Substitute devices may accomplish the same result and the following example should be understood to be an illustration, and not a limitation, of preferred circuit components and operation.

The output polarity of circuit 37 is in an initial or present state. For purposes of this example, the initial state is to be positive. Microcomputer 14 has the rapper location and this positive polarity stored in memory. Circuits $T_2$ and $T_3$ are conducting and circuits $T_1$ and $T_4$ are off. Accordingly, output terminal 70 is positive with respect to output terminal 72.

Next, central computer 12 instructs microcomputer 14 to again energize the rapper. Microcomputer 14 obtains the polarity from memory, compliments it, and stores the new polarity back in memory. To illustrate, an appropriate bit (or word) representing the polarity of a corresponding rapper location may be set. When a bit is set, it is represented as a one (1) and has an associated direct current (DC) voltage (5 V). This is called a "high state". By contrast, a cleared bit is represented as a zero (0) and has an associated "low state" voltage of zero volts. The compliment of a one (1) is a zero (0) and visa versa. It should be understood that numerous combinations of bits, words, and voltage variations may be employed to represent the polarity of an accompanying rapper location. In the present example, a positive polarity is represented by a set bit (i.e., a one (1)). Microcomputer 14, having obtained the polarity (positive polarity represented by a one), complimented it (to a negative polarity represented by a zero), and stored the new polarity back in memory sends this new "low state" signal to polarity reversal circuit 37.

The low state (zero volt) signal is inverted to high state (5 volts) at invertor 60. This inverted high state signal serves to turn off TRIAC circuits $T_2$ and $T_3$ through optocoupler $U_2$ and $U_3$. Referring solely to $U_3$, this occurs because a high voltage at node 64 stops current flow through optocoupler $U_3$. TRIAC 68 is now off and is in a high impedance nonconducting state. A similar analysis applies to optocoupler $U_1$.

Simultaneously, the inverted high state signal is again inverted (back to low state) at inverter 62 and sent to optocouplers $U_1$ and $U_4$. Referring solely to optocoupler $U_4$ (the same analysis applies to $U_1$), low voltage at node 66 causes current to flow. This activates optocoupler $U_4$ thereby interfacing circuit $T_4$ with microcomputer 14. This places the device in a highly conductive state, and therefore it is on. The conducting on state TRIAC circuits $T_1$ and $T_4$ supply negative polarity to the rappers.

When the next energization of the rappers occurs, the process is repeated. However, on the next energization, circuits $T_2$ and $T_3$ will conduct, and circuits $T_1$ and $T_4$ will not conduct. This will result in a positive polarity since $T_3$ is connected to positive input terminal 80 and $T_2$ is connected to negative input terminal 82.

From the foregoing it will be seen that this invention is one well adapted to attain all end and objects hereinabove set forth together with the other advantages which are obvious and which are inherent to the structure.

It will be understood that certain features and subcombinations are utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A multiple rapper control for an electrostatic precipitator, said rapper control comprising:

a plurality of electrostatic precipitator rappers including a plurality of rapper types;

means for switching having a plurality of switches wherein each said rapper is connected to at least one of said switches;

power control means with an output connected to said switch means to vary power to each said rapper, said power control means including a pair of SCRs connected in a predetermined configuration;

current detecting means connected between said power control means and said switch means to sense and measure the peak electrical input current to each said rapper;

a computer with memory means, said computer connected to said current detecting means, to said power control means and to said switch means for storing pre-set open and short circuit fault conditions of each said rapper; and logic means to control power to each said rapper in a preselected logic sequence, wherein said logic sequence changes said measured peak electrical input current of the rapper being sensed to a digital word representing actual peak rapper input current, retrieves said pre-set open and short fault conditions associated with the rapper being sensed from said memory means, compares said digital word with said retrieved open and short fault conditions to determine if a fault condition is present, and sends information to said power control means to

2. The multiple rapper control of claim 1, said logic means comprising:

means for energizing a first predetermined group of a plurality of said rappers; and means for energizing a second predetermined group of a plurality of said rappers, wherein at least one of said rappers in said first predetermined sequence is one of said rappers in said second predetermined sequence.

3. The multiple rapper control of claim 1 wherein said switch means is comprised of a TRIAC switch device.

4. The multiple rapper control of claim 3 wherein said logic sequence de-energizes a rapper having a fault condition present with one-half cycle to protect the circuit.

5. The multiple rapper control of claim 4 wherein said logic means further comprise means to prevent reenergization of each said rapper with a fault condition present.

6. A multiple rapper control for an electrostatic precipitator, said rapper control for controlling the energization of a plurality of rapper types, said rapper control comprising:

a plurality of electrostatic precipitator rappers, said plurality of rappers including a plurality of rapper types;

means for switching having a plurality of switches wherein each said rapper is connected to at least one of said switches;

means for controlling power with an output connected to said switch means to vary power to each said rapper, said power control means including a pair of SCRs connected in a predtermined configuration;

and logic means to control power to said plurality of rappers including a plurality of rapper types in a preselected logic sequence.

7. The multiple rapper control of claim 6 wherein said plurality of rapper types includes AC rappers, DC rappers and vibrators.

8. The multiple rapper control of claim 6, said preselected logic means further performing:

energizing a first predetermined group of a plurality of said rappers; and energizing a second predetermined group of a plurality of said rappers, wherein at least one of said rappers in said first predetermined group is one of said rappers in said second predetermined group.

9. The multiple rapper control of claim 6 wherein said switch means is a TRIAC switch device.

10. The multiple rapper control of claim 9 further comprising:

means for detecting current connected between said power control means and said switch means to sense and measure the peak electrical current at each said rapper; and a computer with memory said computer connected to said current detecting means, to said power control means and to said TRIAC switch device for storing a look-up table including the operating characteristics of each said rapper.

11. The multiple rapper control of claim 10 wherein said look-up table of operating characteristics of each said rapper comprises the pre-set electrical input current, the minimum increment between energization cycles, and the maximum duration of energization.

12. The multiple rapper control of claim 11, said logic means further comprising:

means for retrieving from memory said increment between said energization cycles and determining the appropriate time to begin energizing each said rapper;

means for retrieving from memory said duration of energization and said pre-set electrical input current characteristic;

means for sending to said power control means appropriate information to pass rapper current from said power source, wherein said passed current is substantially similar to said pre-set electrical input current characteristic;

means for sending to said power control means appropriate information to determine the completion of said energization cycle and to cease energization of each said rapper at that time;

means for sending to said TRIAC switch device appropriate information to allow current to flow to each said rapper;

means for sending to said current detecting means appropriate information to sense, measure, and hold the actual peak electrical input current to each said rapper;

means for retrieving from said current detecting means said measurement of the actual peak electrical input current to each said rapper, and means for converting said measurement to a digital word;

means for comparing said digital word with said preset stored electrical input current characteristic;

means for sending to said power control means appropriate information, means for accounting for required adjustments based on said comparison, means to pass rapper current from said power source substantially similar to said pre-set electrical current input characteristic;

means for repeating the sequence of retrieving from said current detecting means said measurement of actual rapper input current, converting said measurement to said digital word, comparing said digital word to said pre-set electrical input current characteristic, and sending appropriate information to said power control means until said energization cycle is complete; and means for determining the completion of said energization cycle and means for sending the appropriate information to said TRIAC switch device to de-energize said rapper.

13. The multiple rapper control of claim 12 wherein open and short circuit fault conditions are determined and each said rapper is automatically de-energized in such cases, said rapper control including:

pre-set open and short trip conditions stored in said look-up table; and said logic sequence retrieves said open and short trip conditions from said look-up table and compares said digital word, representing actual peak rapper input current, with said pre-set open and short trip conditions to determine a fault condition, and sends appropriate information to said power control means to de-energize each said rapper upon fault detection; and said computer having logic means to avoid re-energizing each said rapper having a present fault condition.

14. A multiple rapper control for an electrostatic precipitator, said rapper control comprising:

a plurality of electrostatic precipitator rappers;

means for switching having a plurality of switches wherein each said rapper is connected to at least one of said means for controlling power with an output connected to said switch means to vary the input power to each said rapper;

and logic means to control power to said plurality of rappers wherein each said rapper is included in one of a plurality of preselected groups of rappers and at least one rapper is common to at least two of said preselected groups of rappers.

15. The multiple rapper control of claim 14 further comprising:

means for detecting current connected between said power control means and said switch means to sense and measure the peak electrical current to each said rapper;

a computer with memory means, said computer connected to said current detecting means, to said power control means and to said switch means for storing pre-set open and short circuit fault conditions of each said rapper; and said logic means further comprising the sequence of changing said measured peak electrical input current of the rapper being sensed to a digital word representing actual peak rapper input current, retrieving said open and short fault conditions associated with the rapper being sensed from said memory means, comparing said digital word with said retrieved open and short fault conditions to determine if a fault conditions is present, and sending information to said power control means to de-energize the rapper that is being sensed upon the detection of a fault.

16. The multiple rapper control of claim 14 wherein said means for controlling power includes a pair of SCRs connected in a predetermined configuration and said plurality of electrostatic precipitator rappers includes a plurality of rapper types.

17. The multiple rapper control of claim 16 wherein said switch means is a TRIAC switch device.

18. A multiple rapper control for an electrostatic precipitator, said rapper control adapted to control the energization of plurality of rapper types, said rapper control comprising:

a plurality of electrostatic precipitator rappers selected from the group consisting of AC rappers, DC rappers, and vibrators including any combination thereof;

means for switching having a plurality of switches wherein each said rapper is connected to at least one of said switches;

means for controlling power having an output connected to said switch means to vary power to each said rapper, said power control means including a pair of SCRs connected in a predetermined configuration;

and logic means to control power to each said rapper in a preselected logic sequence, said logic sequence controlling said rappers selected from the group consisting of AC rappers, DC rappers and vibrators including any combination thereof.

19. The multiple rapper control fo claim 1, 6, 16 or 18 wherein said SCRs are connected in an inverse parallel relationship.

20. The method of detecting and curing open and short current fault conditions in a plurality of rappers, including a plurality of rapper types, in an electrostatic precipitator, said method comprising the steps of:

storing in a memory means predetermined current values indicative of open and short current fault conditions associated with each said rapper type;

sensing and measuring the peak electrical current at each said rapper;

comparing said measured peak electrical current of the rapper being sensed with said predetermined open and short current fault conditions associated with the rapper being sensed;

de-energizing the rapper that is being sensed if said comparison indicates the presence of an open or short current fault condition; and automatically re-energizing the de-energized rapper once said open or short fault condition is extinguished.

21. The mehtod as set forth in claim 20 wherein said predetermined current values indicative of open and short circuit fault conditions include an upper-limit value representative of said short circuit fault condition for each rapper type and a lower-limit value representative of said open circuit fault condition for each rapper type and de-energizing the rapper that is being sensed includes de-energizing said sensed rapper if said measured peak electrical current departs from the desired rapper operating range as defined by said predetermined upper-limit and said predetermined lower-limit values.

22. The method as set forth in claim 20 wherein said de-energizing the rapper that is being sensed occurs within one-half cycle to assure maximum circuit protection.

23. The method as set forth in claim 20 further comprising the step of sensing and measuring the peak electrical current at each said rapper wherein said rappers are comprised of a plurality of rapper types.

24. The method as set forth in claim 20, said step of sensing and measuring the peak electrical current at each said rapper further comprising the steps of:

sensing and measuring the peak electrical current of each rapper in a first predetermined gourp of a plurality of said rappers; and sensing and measuring the peak electrical current in a second predetermined group of a plurality of said rappers, wherein at least one of said rappers in said first predetermined group is one of said rappers in said second predetermined group.

25. The method of claim 20 wherein said step of supplying power includes supplying power through SCRs connected in an inverse parallel relationship.

26. The method of controlling a plurality of rappers in an electrostatic precipitator, said method comprising the steps of:

providing a plurality of electrostatic precipitator rappers, wherein said plurality of rappers is comprised of a plurality of rapper types;

supplying power to each said rapper through a pair of SCRs which are connected in a predetermined configuration;

sensing and measuring the peak electrical current at each said rapper;

comparing said measured peak current of the rapper being sensed with a preset, desired peak current value associated with the rapper being sensed;

adjsuting said measured peak current to substantially the preset, desired value if said measured peak current departs from said preset value, thereby maintaining said rapper operation at a desired level, and providing a unitary rapper control system for controlling the power to a plurality of rappers including a plurality of rapper types.

27. The method as set forth in claim 26, said step of sensing and measuring the peak electrical current at each said rapper further comprising the steps of:

sensing and measuring the peak electrical current in a first predetermined sequence of a plurality of said rappers; and sensing and measuring the peak electrical current in a second predetermined sequence of a plurality of said rappers, wherein at least one of said rappers in said first predetermined sequence is one of said rappers in said second predetermined sequence.

28. The method as set forth in claim 26 including the step of comparing said measured peak current of the rapper being sensed with predetermined current limits, for the rapper that is being sensed, said current limits indicative of open and short circuit fault conditions; and de-energizing said rapper that is being sensed if said comparison indicates the presence of an open or short fault condition.

29. The method of claim 28 including de-energizing said rapper within one-half cycle to prevent system damage.

30. The method of controlling the power to a plurality of rappers in an electrostatic precipitator; said method comprising:

energizing a first predetermined group of a plurality of said rappers; and energizing a second predetermined group of a plurality of said rappers, wherein at least one of said rappers in said first predetermined rapper group is one of said rappers in said second predetermined rapper group.

31. The method of claim 30 wherein said energizing a first predetermined group of a plurality of said rappers and said energizing a second predetermined group of a plurality of said rappers includes energizing rappers of a plurality of rapper types.

32. The method of claim 30 further comprising detecting and curing open and short current fault conditions in a plurality of rappers in an electrostatic precipitator, said method comprising the steps of:

storing in a memory means predetermined current values indicative of open and short current fault conditions associated with each said rapper;

sensing and measuring the peak electrical current at each said rapper;

comparing said measured peak electrical current of the rapper being sensed with said predetermined open and short current fault conditions associated with the rapper being sensed; and de-energizing the rapper that is being sensed if said comparison indicates the presence of an open or short current fault condition.

33. A multiple rapper control for an electrostatic precipitator, said rapper control comprising:

a plurality of electrostatic precipitator rappers;

means for switching for providing polarity reversal to said rappers, said switch means having a plurality of switches wherein each said rapper is connected to at least one of said switches;

means for controlling power having an output connected to said switch means to vary power to each said rapper;

a computer with memory, said computer connected to said power control means and to said switch means, said computer for storing the location of each said rapper and an initial polarity of each said rapper;

logic means to control power to each said rapper in a preselected logic sequence; and means for reversing the polarity of power supplied to each said rapper, said polarity reversal means connected to said plurality of electrostatic precipitator rappers to prevent magnetization of said rappers, said polarity reversal means including means for damping to dissipate electrical characteristics that have washed back from said rapper, thereby protecting the circuit and reducing residual magnetism and heat at the rapper and circuit components.

34. The multiple rapper control of claim 33 wherein said damping means comprise a damper diode bridge.

35. The multiple rapper control of claim 33 wherein said switch means comprises a plurality of TRIACs whereby each said TRIAC connects to said computer and to at least one of said rappers.

36. The multiple rapper control of claim 35 wherein said switch means comprises at least four (4) TRIACs, and further including input supply means having a positive terminal connected to a first preselected pair of said TRIACs and a negative terminal connected to a second preselected pair of said TRIACs.

37. The multiple rapper control of claim 33 wherein said polarity reversal means comprises:

a bridge combination having a positive and negative output terminal;

a first pair of TRIACs each said TRIAC of said first pair having an input terminal connected to said positive output terminal of said bridge combination;

a second pair of TRIACs each said TRIAC of said second pair having an input terminal connected to said negative output terminal of said bridge combination;

output terminal supply means for providing polarity reversal to said rapper whereby the output of a first TRIAC of said first pair of TRIACs connects with the output of a first TRIAC of said second pair of TRIACs and, the output of a second TRIAC of said first pair of TRIACs connects with the output of a second TRIAC of said second pair of TRIACs such that said rapper receives a first polarity when said first TRIAC of said first pair of TRIACs and said second TRIAC of said second pair of TRIACs are conducting and said rapper receives a second polarity opposite that of said first polarity when said second TRIAC of said first pair of TRIACs and said first TRIAC of said second pair of TRIACs are conducting; and coupling means connected to each of said TRIACs and said computer to allow communication therebetween.

38. The multiple rapper control of claim 37, said logic means further comprising:

means for retrieving from said memory said location and initial polarity of a rapper;

means for complimenting said present polarity to a subsequent polarity opposite said initial polarity;

means for storing said subsequent polarity back in said memory corresponding to said rapper location; and means for sending to said TRIACs an appropriate signal for turning off said TRIACs which are presently on and turning on said TRIACs which are presently off thereby supplying said subsequent polarity to said rapper.

39. The method of eliminating magnetization of rapper components in a multiple rapper control of an electrostatic precipitator, said multiple rapper control comprising a power source connected to a switch means, said switch means having first and second output terminals, and at least one rapper having first and second input terminals, said method comprising the steps of:

first setting said switch means whereby said first output terminal of said switch means is connected with said first input terminal of said rapper and said second output terminal of said switch means is connected with said second input terminal of said rapper;

initially energizing said rapper by supplying power to said switch means having said first setting, whereby the input integrity of said switch means remains constant each time said rapper is energized;

second setting said switch means whereby said first output terminal of said switch means is connected with said second input terminal of said rapper and said second output terminal of said switch means in connected with said first input terminal of said rapper;

subsequently energizing said rapper by supplying power to said switch means having said second setting, whereby the input integrity of said switch means remains constant each time said rapper is energized, thereby energizing said rapper with a polarity opposite that of said first energizing step to prevent rapper magnetization; and damping electrical characteristic washback associated with each said rapper energizing step to protect said multiple rapper control and increase operating efficiency by dissipating excess energy associated with each rapper energizing step thereby further reducing residual magnetism and excess heat resulting from said energizing steps.

40. The method as set forth in claim 39, said multiple rapper control further comprising a computer with memory means connected to said swith means, said method further comprising the steps of:

storing in said memory means the location of said rapper and data indicative of said first setting of said switch means;

retrieving from said memory means said location and said data indicative of said first setting of said switch means, said retrieving step performed prior to said subsequent energizing step;

complimenting said data indicative of said first setting of said switch means to obtain data indicative of said second setting of said switch means;

storing said complimented data back in said memory corresponding to said rapper location; and sending an appropriate signal to said switch means to set said switch means to said second setting.

41. A multiple rapper control comprising:

a plurality of electrostatic percipitator rappers;

means for switching connected to said plurality of rappers;

a computer with memory, said computer connected to said switch means;

means connected to said computer for inputting into said memory information defining desired firing activity for each said rapper thereby forming for each said rapper a firing relationship with respect to all other rappers, said input means including means to alter said firing relationship; and means for controlling power to each said rapper, said power control means connected between said computer and said switch means for controlling power to said each said rapper and causing each rapper to be fired in accordance with its firing relationship with respect to all other rappers.

* * * * *

UNITED STATES PATENT AND TRADEMARK OFFICE
CERTIFICATE OF CORRECTION

PATENT NO. : 5,173,867

DATED : December 22, 1992

INVENTOR(S) : David F. Johnston, et al

It is certified that error appears in the above-identified patent and that said Letters Patent is hereby corrected as shown below:

In Claim 1, column 11, beginning at line 68, after the words "control means to", please add:

--de-energize the rapper that is being sensed upon the detection of a fault.--

Signed and Sealed this

Twenty-sixth Day of July, 1994

Attest:

Bruce Lehman

BRUCE LEHMAN

*Attesting Officer* *Commissioner of Patents and Trademarks*